(12) United States Patent
Bankaitis et al.

(10) Patent No.: US 9,422,187 B1
(45) Date of Patent: Aug. 23, 2016

(54) LASER SINTERING SYSTEM AND METHOD FOR FORMING HIGH PURITY, LOW ROUGHNESS SILICA GLASS

(71) Applicant: Corning Incorporated, Corning, NY (US)

(72) Inventors: Jonas Bankaitis, Horseheads, NY (US); Venkata Adiseshaiah Bhagavatula, Big Flats, NY (US); Daniel Warren Hawtof, Corning, NY (US); Xinghua Li, Horseheads, NY (US); Gary Edward Merz, Rochester, NY (US); John Stone, III, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/862,771

(22) Filed: Sep. 23, 2015

Related U.S. Application Data

(60) Provisional application No. 62/208,210, filed on Aug. 21, 2015.

(51) Int. Cl.
*C03C 3/06* (2006.01)
*C03B 19/14* (2006.01)

(52) U.S. Cl.
CPC .............. *C03C 3/06* (2013.01); *C03B 19/1453* (2013.01); *C03B 2201/03* (2013.01); *C03C 2201/02* (2013.01)

(58) Field of Classification Search
CPC .. C03C 3/06; C03C 2201/02; C03B 19/1453; C03B 2201/03
See application file for complete search history.

(56) References Cited

U.S. PATENT DOCUMENTS

| 1,998,300 | A | 4/1935 | Ackermann |
| 2,418,208 | A | 4/1947 | Walker |
| 2,719,581 | A | 10/1955 | Greathead |
| 3,338,696 | A | 8/1967 | Dockerty |
| 3,437,470 | A | 4/1969 | Overman |
| 3,682,609 | A | 8/1972 | Dockerty |
| 3,806,570 | A | 4/1974 | Flamenbaum et al. |

(Continued)

FOREIGN PATENT DOCUMENTS

| CN | 103964413 A | 8/2014 |
| DE | 155896 | 7/1982 |

(Continued)

OTHER PUBLICATIONS

Silica Glass. Crystran.co.uk. Retrieved Jan. 12, 2016 from http://www.crystran.co.uk/optical-materials/silica-glass-sio2.*

(Continued)

*Primary Examiner* — Laura Auer
(74) *Attorney, Agent, or Firm* — Russell S. Magaziner; James D. Borchardt

(57) ABSTRACT

A system and method for making a thin sintered silica sheet is provided. The method includes providing a soot deposition surface and forming a glass soot sheet by delivering a stream of glass soot particles from a soot generating device to the soot deposition surface. The method includes providing a sintering laser positioned to direct a laser beam onto the soot sheet and forming a sintered glass sheet from the glass soot sheet by delivering a laser beam from the sintering laser onto the glass soot sheet. The sintered glass sheet formed by the laser sintering system or method is thin, has low surfaces roughness and/or low contaminant levels.

29 Claims, 10 Drawing Sheets

(56) References Cited

U.S. PATENT DOCUMENTS

| | | | |
|---|---|---|---|
| 3,844,751 A | 10/1974 | Stewart | |
| 4,082,526 A | 4/1978 | Estes et al. | |
| 4,152,166 A | 5/1979 | Rogers | |
| 4,298,385 A | 11/1981 | Claussen et al. | |
| 4,489,870 A * | 12/1984 | Prange | C03B 33/033 225/2 |
| 4,494,968 A | 1/1985 | Bhagavatula et al. | |
| 4,735,677 A | 4/1988 | Kawachi et al. | |
| 5,124,287 A | 6/1992 | Wehrenberg et al. | |
| 5,599,371 A | 2/1997 | Cain et al. | |
| 5,667,547 A | 9/1997 | Christiansen et al. | |
| 5,922,100 A | 7/1999 | Cain et al. | |
| 6,068,891 A | 5/2000 | O'Dell et al. | |
| 6,121,177 A | 9/2000 | Guigonis et al. | |
| 6,207,603 B1 | 3/2001 | Danielson et al. | |
| 6,263,706 B1 | 7/2001 | Deliso et al. | |
| 6,328,807 B1 | 12/2001 | Boek et al. | |
| 6,606,883 B2 | 8/2003 | Hrdina et al. | |
| 6,736,633 B1 | 5/2004 | Dawson-Elli et al. | |
| 6,743,011 B2 | 6/2004 | Bakshi et al. | |
| 6,794,786 B2 | 9/2004 | Enomoto et al. | |
| 6,837,076 B2 | 1/2005 | Hawtof | |
| 6,974,786 B2 | 12/2005 | Helfinstine et al. | |
| 7,299,657 B2 | 11/2007 | Kohli | |
| 7,677,058 B2 | 3/2010 | Hawtof et al. | |
| 7,704,905 B2 | 4/2010 | Addiego et al. | |
| 8,062,733 B2 | 11/2011 | Hawtof et al. | |
| 8,137,469 B2 | 3/2012 | Hawtof et al. | |
| 8,181,485 B2 | 5/2012 | Coffey et al. | |
| 8,359,884 B2 | 1/2013 | Hawtof | |
| 8,746,013 B2 | 6/2014 | Geremew et al. | |
| 2003/0113679 A1 | 6/2003 | Bakshi et al. | |
| 2003/0167796 A1 | 9/2003 | Hawtof | |
| 2004/0007019 A1 | 1/2004 | Kohli | |
| 2004/0089237 A1 | 5/2004 | Pruett et al. | |
| 2004/0197575 A1 | 10/2004 | Bocko et al. | |
| 2006/0003279 A1 | 1/2006 | Best | |
| 2006/0063351 A1 | 3/2006 | Jain | |
| 2007/0039353 A1 | 2/2007 | Kamiya | |
| 2007/0059533 A1* | 3/2007 | Burdette | C03B 23/04 428/428 |
| 2007/0130995 A1 | 6/2007 | Hawtof et al. | |
| 2007/0267289 A1 | 11/2007 | Jabs et al. | |
| 2008/0196449 A1 | 8/2008 | Addiego et al. | |
| 2008/0280057 A1 | 11/2008 | Hawtof et al. | |
| 2010/0124709 A1 | 5/2010 | Hawtof et al. | |
| 2010/0143601 A1 | 6/2010 | Hawtof et al. | |
| 2010/0291346 A1 | 11/2010 | Hawtof et al. | |
| 2010/0319401 A1 | 12/2010 | Coffey et al. | |
| 2011/0014445 A1 | 1/2011 | Hawtof | |
| 2011/0023548 A1 | 2/2011 | Garner et al. | |
| 2011/0104439 A1* | 5/2011 | Choi | C03C 15/00 428/142 |
| 2011/0167871 A1 | 7/2011 | Vehmas et al. | |
| 2011/0223408 A1 | 9/2011 | Kadomura | |
| 2011/0277632 A1 | 11/2011 | Pant et al. | |
| 2014/0120311 A1* | 5/2014 | Smith | C03C 15/00 428/141 |

FOREIGN PATENT DOCUMENTS

| | | |
|---|---|---|
| EP | 0476693 A2 | 9/1991 |
| EP | 1153894 A1 | 11/2001 |
| EP | 1153894 B1 | 10/2003 |
| EP | 1535884 A1 | 6/2005 |
| EP | 1535884 B1 | 8/2006 |
| JP | 61158874 A | 7/1986 |
| JP | 63252971 A | 10/1988 |
| JP | 09286621 A | 4/1997 |
| JP | 2013237159 A | 11/2013 |
| KR | 1074724 B1 | 10/2011 |
| KR | 2014021527 A | 2/2014 |
| WO | 0214579 A1 | 2/2002 |
| WO | 2005024908 A2 | 3/2005 |
| WO | 2007075138 A1 | 7/2007 |
| WO | 2008136924 A1 | 11/2008 |
| WO | 2009011675 A9 | 1/2009 |
| WO | 2010008911 A2 | 1/2010 |
| WO | 2011008911 A1 | 1/2011 |
| WO | 2014034013 A1 | 3/2014 |
| WO | 2014139147 A1 | 9/2014 |
| WO | 2014180242 A1 | 11/2014 |

OTHER PUBLICATIONS

Hawtof et al.; "Glass Sheet and System and Method for Making Glass Sheet"; Pending U.S. Appl. No. 14/799,201, filed Jul. 14, 2015.

Lal et al.; "Substrate Such as for Use With Carbon Nanotubes"; Pending U.S. Appl. No. 14/593,192, filed Jan. 9, 2015.

Hawtof et al.; "Silica-Containing Sheet and Related System and Methods"; Pending U.S. Appl. No. 14/621,881, filed Feb. 13, 2015.

Hawtof et al.; "High Silica Content Substrate Such as for Use in Thin-Film Battery"; Pending U.S. Appl. No. 14/684,627, filed Apr. 13, 2015.

Hawtof et al.; "Electrostatic Method and Apparatus to Form Low-Particulate Defect Thin Glass Sheets"; Pending U.S. Appl. No. 13/477,566, filed May 22, 2012.

Awaad et al.; "Sintering of zircon: the role of additives"; British Ceramic Transactions 2003, vol. 102, No. 2; pp. 69-72.

Huang et al.; "Patterned Growth and Contact Transfer of Well-Aligned Carbon Nanotube Films"; J. Phys. Chem. B 1999, 103; pp. 4223-4227.

Liu et al.; "Discrete-element method for particle capture by a body in an electrostatic field"; Int. J. Numer. Meth. Engng 2010, 84; pp. 1589-1612.

Murakami et al.; "Direct synthesis of high-quality single-walled carbon nanotubes on silicon and quartz substrates"; Chemical Physics Letters 377 (2003); pp. 49-54.

Murakami et al.; "Growth of vertically aligned single-walled carbon nanotube films on quartz substrates and their optical anisotropy"; Chemical Physics Letters 385 (2004); pp. 298-303.

Saha et al.; "Films of Bare Single-Walled Carbon Nanotubes from Superacids with Tailored Electronic and Photoluminescence Properties"; American Chemical Society vol. 6, No. 6 (2012); pp. 5727-5734.

Schnitzler et al.; "Incorporation, Oxidation and Pyrolysis of Ferrocene into Porous Silica Glass: a Route to Different Silica/Carbon and Silicon/Iron Oxide Nanocomposites"; Inorganic Chemistry 2006, 45; pp. 10642-10650.

GlassOn Web; "The Achille Heel of a Wonderful Material: Toughened Glass"; Nov. 2006; http://www.glassonweb.com/articles/article/330.

Vemury et al.; "Charging and Coagulation During Flame Synthesis of Silca"; J. Aerosol Sci. vol. 27, No. 6 (1996); pp. 951-966.

Ward et al.; "Substrate effects on the growth of carbon nanotubes by thermal decomposition of methane"; Chemical Physics Letters 376 (2003); pp. 717-725.

\* cited by examiner

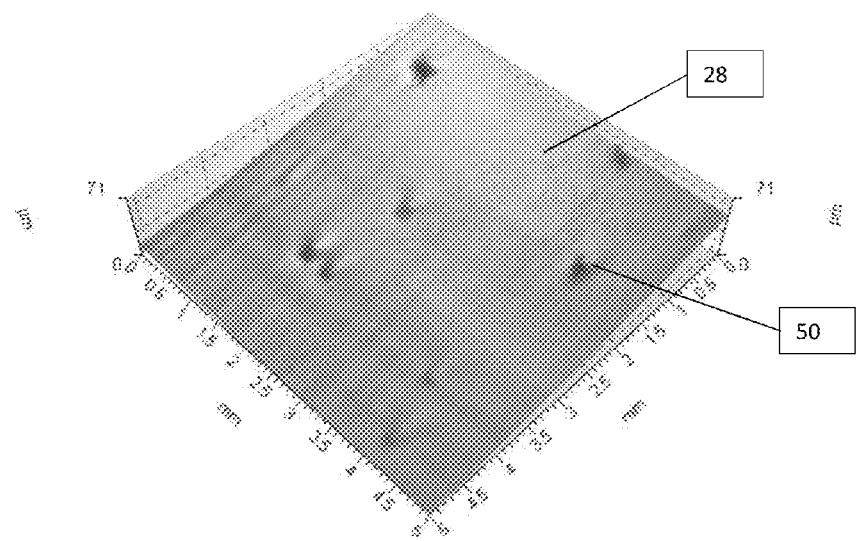
FIG. 7
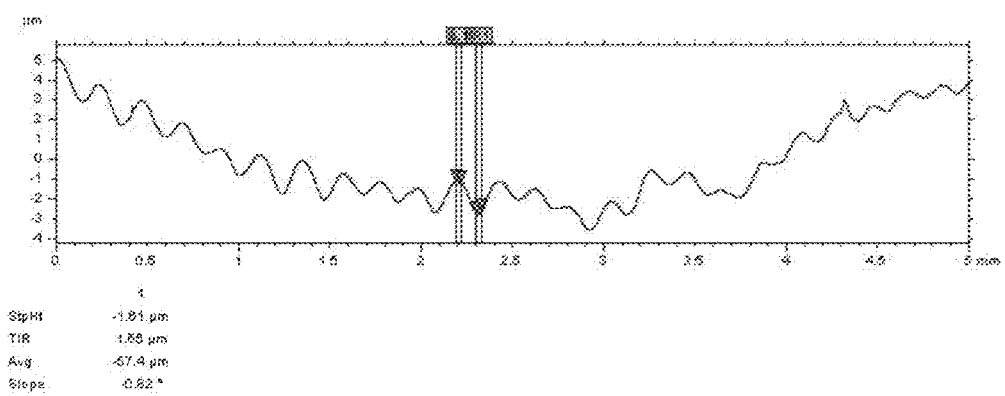
FIGS. 8A - Bottom Scan

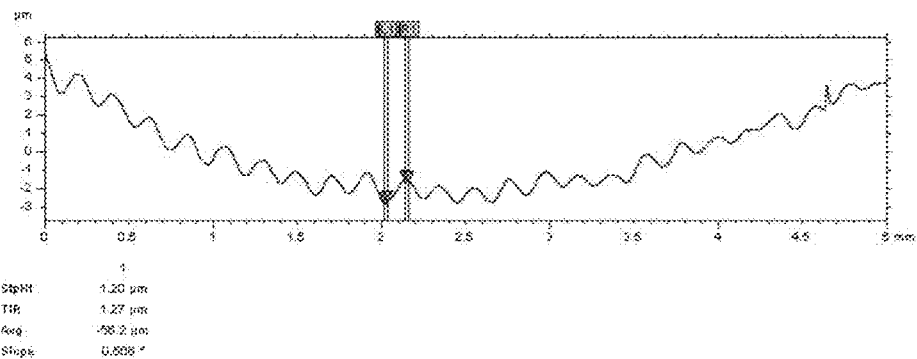
FIG. 8B - Center Scan
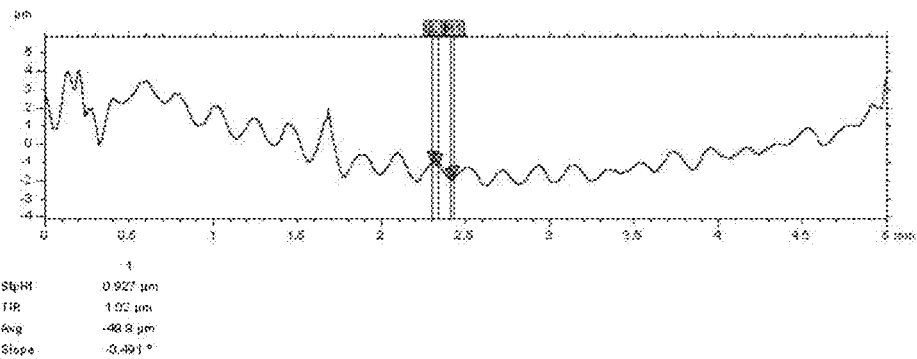
FIG. 8C - Top Scan

| Condition | Surface Image |
|---|---|
| Incomplete SiO2 soot sintering with fixed optic line scan leaving a "pebbly" surface.<br><br>500 micron soot sheet, ~0.35g/cc bulk density, 100W at 0.65mm/s<br><br>*Nikon Eclipse 50iPOL optical image with with reflective light a 500x.* | 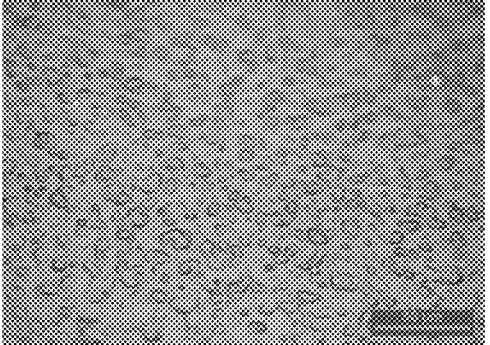 |
| Incomplete sinter of a SiO2 sheet with galvo laser (rastering) leading to somewhat structured topology.<br><br>600 micron soot sheet, ~0.35g/cc bulk density, 200W CO2 laser at 1.3mm/s.<br><br>*Nikon Eclipse 50iPOL optical image with reflected light at 25X.* | 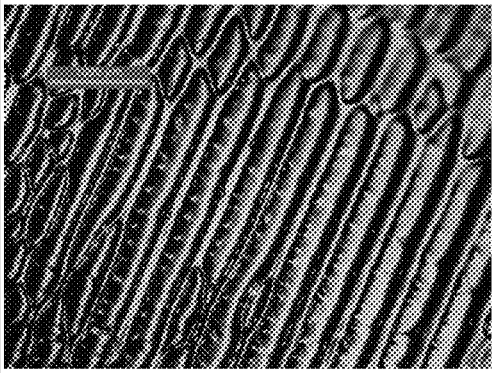 |
| Complete sinter with a very smooth surface is achievable by sintering at sufficient temp/time.<br><br>500 micron soot sheet, ~0.35g/cc bulk density, 300 Watts CO2 laser at 1.95mm/s.<br><br>*Nikon Eclipse 50iPOL optical image with reflected light at 200X.* | 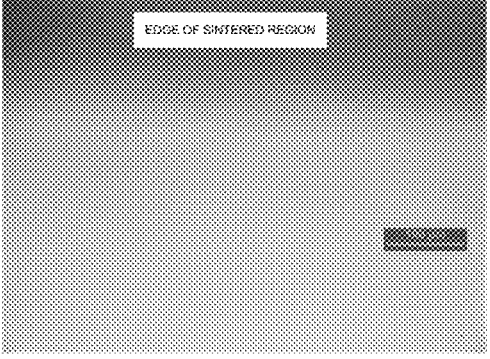 |

FIG. 10

LASER SINTERING SYSTEM AND METHOD FOR FORMING HIGH PURITY, LOW ROUGHNESS SILICA GLASS

This application claims the benefit of priority under 35 U.S.C. §119 of U.S. Provisional Application Ser. No. 62/208,210, filed on Aug. 21, 2015, the content of which is relied upon and incorporated herein by reference in its entirety.

BACKGROUND

The disclosure relates generally to formation of silica-containing articles, and specifically to the formation of thin silica glass sheets. Silica soot may be generated by a process, such as flame hydrolysis. The silica soot may then be sintered to form a transparent or partially transparent glass sheet.

SUMMARY

One embodiment of the disclosure relates to a method for making a thin sintered silica sheet. The method includes providing a soot deposition surface and forming a glass soot sheet by delivering a stream of glass soot particles from a soot generating device to the soot deposition surface. The method includes providing a sintering laser positioned to direct a laser beam onto the glass soot sheet and moving at least one of the glass soot sheet and the sintering laser relative to the other. The method includes forming a sintered glass sheet from the glass soot sheet by delivering a laser beam from the sintering laser onto the glass soot sheet. An average thickness of the sintered glass sheet is less than 500 µm, and the laser beam has an energy density between 0.001 $J/mm^2$ and 10 $J/mm^2$ during sintering.

An additional embodiment of the disclosure relates to a high purity sintered silica glass sheet. The sheet includes a first major surface and a second major surface opposite the first major surface. The sheet includes at least 99.9 mole % silica, and a sodium (Na) content of the silica glass sheet is less than 50 ppm. The sheet includes an average thickness between the first major surface and the second major surface of less than 500 µm. A roughness (Ra) of the first major surface is between 0.025 nm and 1 nm over at least one 0.023 $mm^2$ area of the first major surface.

An additional embodiment of the disclosure relates to high purity sintered silica glass sheet. The sheet includes a first major surface and a second major surface opposite the first major surface. The sheet includes at least 99.9 mole % silica, and a sodium (Na) content of silica glass sheet is less than 50 ppm. The sheet includes an average thickness between the first major surface and the second major surface of less than 500 µm. The sheet is fully sintered, and the sheet includes a plurality of voids located on at least one of the first major surface, the second major surface and an internal area between the first and second major surfaces such that the density of the fully sintered silica glass sheet is greater than 1.8 g/cc and less than 2.203 g/cc. At least some of the voids are on the first major surface forming depressions located on the first major surface.

An additional embodiment of the disclosure relates to a high purity sintered silica glass sheet. The sheet includes a first major surface and a second major surface opposite the first major surface. The sheet includes an edge section surrounding the first and second major surfaces and defining an outer perimeter of the silica glass sheet. The sheet includes at least 99.9 mole % silica, and a sodium (Na) content of silica glass sheet is less than 50 ppm. The sheet includes an average thickness between the first major surface and the second major surface of less than 500 µm. The edge section has an increased maximum thickness that is at least 10% greater than the average thickness.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

FIG. 7 is a 3D micro-scale representation of a measured profile of a surface of a laser sintered silica glass sheet formed via laser sintering according to an exemplary embodiment.

FIG. 8A-8C are atomic force microscopy profile scans of the glass sheet surface shown in FIG. 7 according to an exemplary embodiment.

FIG. 10 shows magnified surface images surfaces of laser sintered silica glass sheets formed via various laser sintering processes according to exemplary embodiments.

DETAILED DESCRIPTION

Referring generally to the figures, various embodiments of a sintered silica glass sheet/material as well as related systems and methods are shown. In various embodiments, the system and method disclosed herein utilizes one or more glass soot generating device (e.g., a flame hydrolysis burner) that is directed or aimed to deliver a stream of glass soot particles on to a soot deposition device or surface forming a glass soot sheet. The soot sheet is then sintered using a laser forming a silica glass sheet. In general, the laser beam is directed onto the soot sheet such that the soot densifies forming a fully sintered or partially sintered silica glass sheet. In various embodiments, the configuration and/or operation of the glass soot generating device, the soot deposition surface and/or the sintering laser are configured to form a sintered glass sheet having very high surface smoothness as compared to some sintered silica glass sheets formed from sintered silica soot (e.g., as compared to furnace and torch processes, and some other laser sintering processes). In some embodiments, the glass sheet formation process discussed herein forms a silica glass sheet having surface characteristics that are distinct from the surface characteristic of a polished silica surface such a polished, silica boule surface.

Further, the configuration and/or operation of the glass soot generating device, the soot deposition surface and/or the sintering laser are configured to form a sintered glass sheet having very low levels of certain contaminants (e.g., sodium (Na), surface hydroxyl groups, etc.) commonly found in silica materials formed using some other methods. Applicant has found that by using the laser sintering process and system discussed herein, sintered silica glass sheets can be provided with a high surface smoothness and low contaminant content without requiring additional polishing steps in some embodiments.

In further additional embodiments, sintered silica glass sheets discussed herein have a thickened or bulb shaped edge section that is formed by using a high powered cutting laser to cut out a section from the sintered silica glass sheet. This cut section can then be used in various ways as desired (e.g., a substrate for various devices and processes). The thickened edge section defines the outer perimeter of the cut silica glass sheet, and Applicant has found results in a silica sheet with various improved physical characteristics, such as improved strength characteristics.

Figure 1:
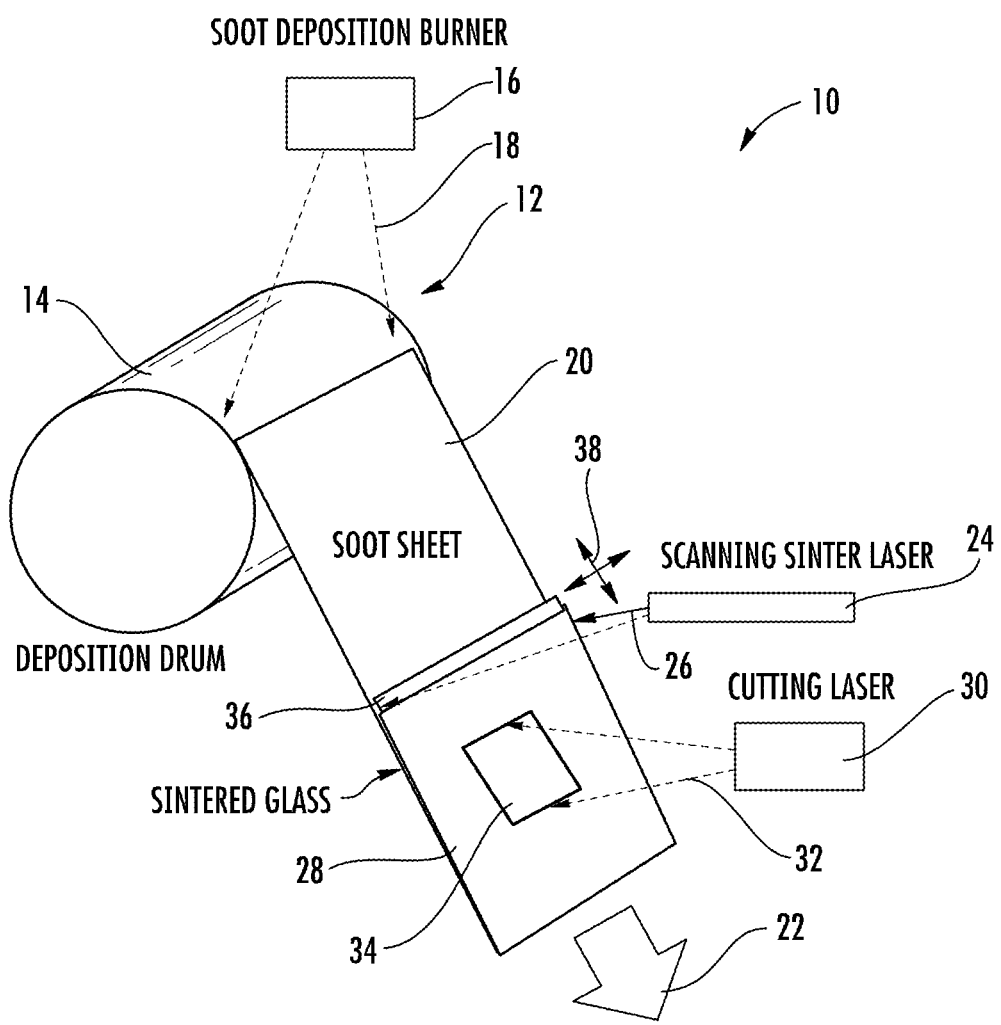
FIG. 1 shows a laser sintering system according to an exemplary embodiment.

Referring to FIG. 1, a system and method for forming a high purity, high smoothness silica glass sheet is shown according to an exemplary embodiment. As shown in FIG. 1, system 10 includes a soot deposition device, shown as deposition drum 12, having an outer deposition surface 14. System 10 includes a soot generating device, shown as soot burner 16 (e.g., a flame hydrolysis burner), that directs a stream of glass soot particles 18 onto deposition surface 14 forming glass soot sheet 20.

As shown in FIG. 1, drum 12 rotates in the clockwise direction such that soot sheet 20 is advanced off of drum 12 in a processing direction indicated by the arrow 22 and advanced past sintering laser 24. In some embodiments, soot sheet 20 is in tension (e.g., axial tension) in the direction of arrow 22. In specific embodiments, soot sheet 20 is only in tension (e.g., axial tension) in the direction of arrow 22 such that tension is not applied widthwise across soot sheet 20. Applicant was surprised to identify that widthwise tensioning of the soot sheet during sintering was not needed to maintain the surface characteristics, specifically roughness, discussed herein. However, in at least some other embodiments, soot sheet 20 is tensioned in the widthwise direction. In some embodiments, tensioning in different directions is selected to control the bow or warp of the sintered soot sheet.

As will be explained in more detail below, sintering laser 24 generates a laser beam 26 toward soot sheet 20, and the energy from laser beam 26 sinters glass soot sheet into a partially or fully sintered glass sheet 28. As will be understood, the energy from sintering laser beam 26 causes the densification of glass soot sheet 20 into a partially or fully sintered glass sheet 28. Specifically, laser sintering of silica soot sheet 20 uses laser 24 to rapidly heat soot particles to temperatures above the soot melting point, and as a result of reflow of molten soot particles a fully dense, thin silica glass sheet 28 is formed. In various embodiments, soot sheet 20 has a starting density between 0.2 g/cc to 0.8 g/cc, and silica glass sheet 28 is a fully sintered silica glass sheet having a density of about 2.2 g/cc (e.g., 2.2 g/cc plus or minus 1%). As will be explained in more detail below, in some embodiments, silica glass sheet 28 is a fully sintered silica glass sheet including voids or bubbles such that the density of the sheet is less than 2.2 g/cc. In various other embodiments, soot sheet 20 has a starting density between 0.2 g/cc to 0.8 g/cc, and silica glass sheet 28 is a partially sintered silica glass sheet having a density between 0.2 g/cc and 2.2 g/cc. In various embodiments, sintered glass sheet 28 has length and width between 1 mm and 10 m, and in specific embodiments, at least one of the length and width of sintered glass sheet 28 is greater than 18 inches. It is believed that in various embodiments, system 10 allows for formation of sintered glass sheet 28 having length and/or width dimensions greater than the maximum dimensions of silica structures formed by other methods (e.g., silica boules which are typically limited to less than 18 inches in maximum dimension).

System 10 is configured to generate a soot sheet 20 having a smooth surface topology which translates into glass sheet 28 also having a smooth surface topology. In various embodiments, soot burner 16 is positioned a substantial distance from and/or at an angle relative to drum 12 such that soot streams 18 form a soot sheet 20 having a smooth upper surface. This positioning results in mixing of soot streams 18 prior to deposition onto surface 14. In specific embodiments, the outlet nozzles of soot burner 16 are positioned between 1 inch and 12 inches, specifically 1 inch to 4 inches, and more specifically about 2.25 inches, from deposition surface 14, and/or are positioned at a 30-45 degree angle relative to soot deposition surface 14. In specific embodiments, soot stream 18 can be directed to split above and below drum 12 with exhaust, and in other embodiments, soot stream 18 is directed only to one side of drum 12. In addition, the velocity of soot streams 18 leaving burner 16 may be relatively low facilitating even mixing of soot streams 18 prior to deposition onto surface 14. Further, burner 16 may include a plurality of outlet nozzles, and burner 16 may have a large number of small sized outlet nozzles acting to facilitate even mixing of soot streams 18 prior to deposition onto surface 14. In addition, burner 16 may be configured to better mixing of constituents and soot within channels inside the burners such as via a venturi nozzle and flow guides that generate intermixing and eddies. In some embodiments, these structures may be formed via 3D printing.

In various embodiments, laser 24 is configured to further facilitate the formation of glass sheet 28 having smooth surfaces. For example in various embodiments, sintering laser 24 is configured to direct laser beam 26 toward soot sheet 20 forming a sintering zone 36. In the embodiment shown, sintering zone 36 extends the entire width of soot sheet 20. As will be discussed in more detail below, laser 24 may be configured to control laser beam 26 to form sintering zone 36 in various ways that results in a glass sheet 28 having smooth surfaces. In various embodiments, laser 24 is configured to generate a laser beam having an energy density that sinters soot sheet 20 at a rate that forms smooth surfaces. In various embodiments, laser 24 generates a laser beam having an average energy density between 0.001 $J/mm^2$ and 10 $J/mm^2$, specifically 0.01 $J/mm^2$ and 10 $J/mm^2$, and more specifically between 0.03 $J/mm^2$ and 3 $J/mm^2$ during sintering. In some embodiments, laser 24 may be suited for sintering particularly thin soot sheets (e.g., less than 200 µm, 100 µm, 50 µm, etc. thick), and in such embodiments, laser 24 generates a laser beam having an average energy density between 0.001 $J/mm^2$ and 0.01 $J/mm^2$. In other embodiments, system 10 is configured such that relative movement between soot sheet 20 and laser 24 occurs at a speed that facilitates formation of glass sheet 28 with smooth surfaces. In general, the relative speed in the direction of arrow 22 is between 0.1 mm/s and 10 m/s. In various embodiments, the relative speed in the direction of arrow 22 is between 0.1 mm/s and 10 mm/s, specifically between 0.5 mm/s and 5 mm/s, and more specifically between 0.5 mm/s and 2 mm/s. In various embodiments, system 10 is a high speed sintering system having a relative speed in the direction of arrow 22 between 1 m/s and 10 m/s.

As shown in FIG. 1, in one embodiment, laser 24 utilizes dynamic beam shaping to form sintering zone 36. In this embodiment, laser beam 26 is rapidly scanned over soot sheet 20 generally in the direction of arrows 38. The rapid scanning of laser beam 26 emulates a line-shaped laser beam generally in the shape of sintering zone 36. In a specific embodiment, laser 24 utilizes a two-dimensional galvo scanner to scan laser beam 26 forming sintering zone 36. Using a two-dimensional galvo scanner, laser beam 26 can be rastered across the entire width of soot sheet 20 or across a specific subarea of soot sheet 20. In some embodiments, laser beam 26 is rastered as soot sheet 20 is translated in the direction of arrow 22. During the sintering process the rastering speed may vary depending on the desired sintering characteristics and surface features. In addition, the rastering pattern of laser beam 26 may be linear, sinusoidal, uni-directional, bidirectional, zig-zag, etc., in order to produce sheets with designed and selected flatness, density or other attributes. In such embodiments, laser 24 may use galvo, polygonal, piezoelectric scanners and optical laser beam deflectors such as AODs (acousto-optical deflectors) to scan laser beam 26 to form sintering zone 36.

In a specific embodiment using a dynamic laser beam shaping to form sintering zone 36, a $CO_2$ laser beam was scanned bi-directionally at a speed of 1500 mm/s. The $CO_2$ laser beam has a Gaussian intensity profile with $1/e^2$ diameter of 4 mm. The step size of the bi-directional scan was 0.06 mm. At settings of scan length of 55 mm and a laser power of 200 W, a soot sheet 20 of roughly 400 µm in thickness was sintered into a silica glass sheet 28 of ~100 µm thickness. The effective sintering speed was ~1.6 mm/s, and the sintering energy density was 0.65 $J/mm^2$.

In some embodiments, the dynamic laser beam shaping and sintering approach enables laser power modulation on-the-fly while the laser beam is scanned. For example, if the scanning laser beam has a sinusoidal speed profile, a controller can send a sinusoidal power modulation signal to the laser controller in order to maintain a constant laser energy density on soot sheet 20 within sintering zone 36.

Figure 2:
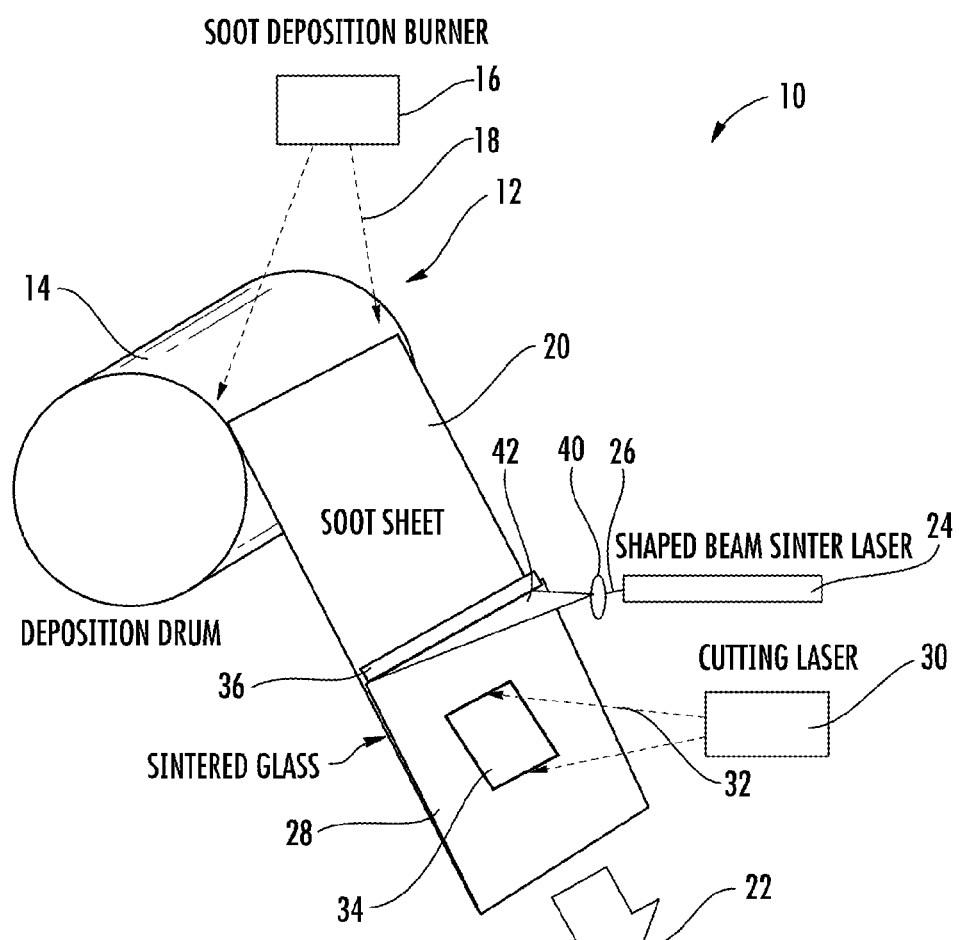
FIG. 2 shows a laser sintering system according to another exemplary embodiment.

As shown in FIG. 2, in one embodiment, laser 24 utilizes a geometrical/diffractive approach to beam shaping to form sintering zone 36. In this embodiment, laser 24 is utilized in combination with a shaping system 40 to transform laser beam 26 into an elongate laser beam 42. In various embodiments, shaping system 40 may include one or more optical element, such as lenses, prisms, mirrors, diffractive optics, etc. to form elongate laser beam 42. In various embodiments, elongate laser beam 42 has a uniform intensity distribution in the width direction across soot sheet 20. In various embodiments, shaping system 40 may be configured to generate an elongate laser beam 42 having a width between 1 mm and 10 m, and a height between 0.5 mm and 10 mm.

In a specific embodiment using geometrical/diffractive laser beam shaping to form sintering zone 36, a $CO_2$ laser beam of 12 mm in diameter was expanded using a beam expander of Galilean design. The expanded laser beam is about 50 mm in diameter. The expanded laser beam was then transformed into a line shape using an asymmetric aspheric lens with a focal length of ~300 mm. The line-shaped laser beam has a dimension of 55 mm×2 mm. The laser power density, which is defined as laser power divided by area, is 1.8 $W/mm^2$. During the sintering process, the line-shaped laser beam is kept stationary while soot sheet 20 was translated. At a laser power of 200 W, a soot sheet 20 of roughly 400 µm in thickness was sintered into a silica glass sheet 28 of ~100 µm thickness at a speed of 1.5 mm/s. The corresponding energy density for sintering is 1.0 $J/mm^2$.

In various embodiments, laser 24 can be a laser at any wavelength or pulse width so long as there is enough absorption by the soot particles to cause sintering. The absorption can be linear or nonlinear. In a specific embodiment, laser 24 is a $CO_2$ laser. In another embodiment, laser 24 may be a CO laser with a wavelength of around 5 µm. In such embodiments, a CO laser 24 can penetrate deeper into soot sheet 20, and thus a CO laser 24 may be used to sinter thicker soot sheets 20. In various embodiments, the penetration depth of a $CO_2$ laser 24 in silica soot sheet 20 is less than 10 µm, while the penetration depth of the CO laser is ~100 µm. In some embodiments, soot sheet 20 may be pre-heated from the backside, for example, using a resistive heater, an IR lamp, etc, to further increase the depth of sintering formed via laser 24.

In some embodiments, system 10 is configured to maintain a constant sintering temperature during the laser sintering process. This can be achieved by adding temperature sensors along the sintering line. The temperature sensor data can be used to control the laser power in order to maintain constant sintering temperature. For example, a series of germanium or silicon detectors can be installed along the sintering line. The detector signals are read by a controller. The controller can process the signals and use the info to control the laser output power accordingly.

Figure 3:
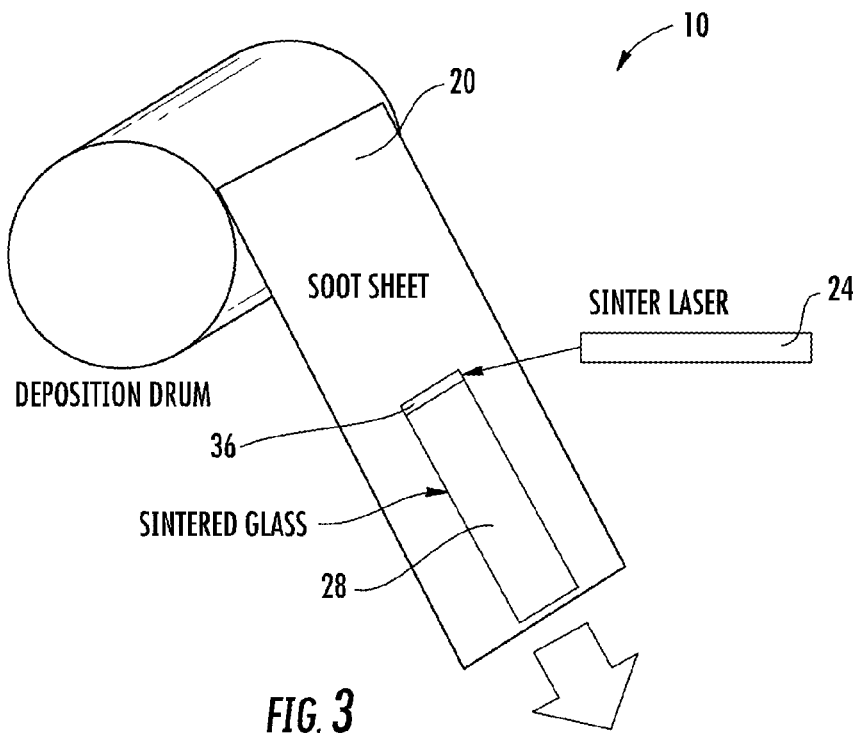
FIG. 3 shows a laser sintering system according to another exemplary embodiment.
Figure 4:
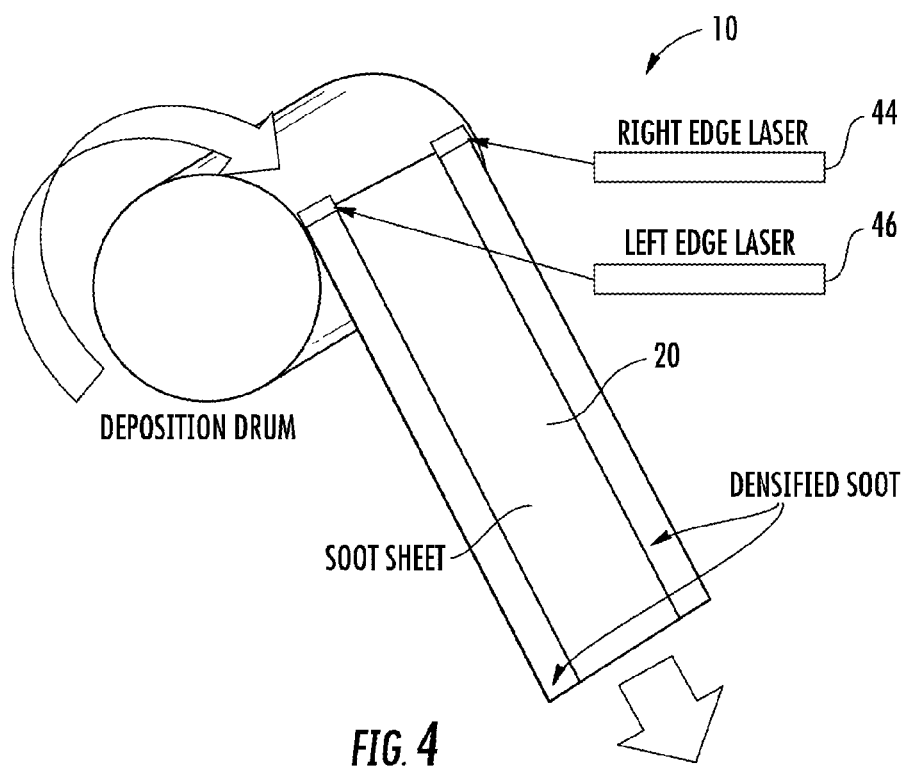
FIG. 4 shows a laser sintering system according to another exemplary embodiment.

Referring to FIG. 3, in one embodiment, laser 24 may be configured to generate sintering zone 36 that does not extend the entire width of soot sheet 20. In some such embodiments, the smaller sintering zone 36 may result in lower unintended heating of equipment adjacent laser 24 and/or soot sheet 20. Referring to FIG. 4, in various embodiments, system 10 may include additional lasers 44 and 46 that are configured to fully or partially sinter edge portions of soot sheet 20. This may facilitate handling of soot sheet 20 during laser sintering to form sintered sheet 28.

In contrast to some silica glass formation processes (e.g., boule formation processes), system 10 is configured to produce silica glass sheet 28 having very high purity levels with very low thicknesses. In various embodiments, silica glass sheet 28 has a thicknesses (i.e., the dimension perpendicular to the major and minor surfaces) of less than 500 µm, of less than 250 µm, of less 150 µm and of less than 100 µm. Further, in various embodiments, silica glass sheet 28 is least 99.9 mole % silica, and specifically at least 99.99 mole % silica. In addition, silica glass sheet 28 is formed having very low levels of contaminant elements common in silica glass formed by other methods. In specific embodiments, silica glass sheet 28 has a total sodium (Na) content of less than 50 ppm. In various embodiments, the sodium content of silica glass sheet 28 is substantially consistent throughout sheet 28 such that the total sodium content is less than 50 ppm at all depths within silica glass sheet 28. This low total sodium content and the even sodium distribution is in contrast to some silica structures (e.g., silica boules) which have higher overall sodium content that varies at different depths within the boule. In various embodiments, it is believed that the low sodium content discussed herein provides glass sheet 28 with optical loss reduction, index of refraction uniformity and chemical purity/non-reactivity as compared to other silica materials with higher sodium content.

In other embodiments, silica glass sheet 28 has a low level of hydroxyl (OH) concentration. In various embodiments, the OH concentration can be controlled to impact the viscosity, refractive properties, and other properties of silica glass sheet 28. In various embodiments, beta OH is less than 0.02 abs/mm and more specifically is less than 0.002 abs/mm. In some embodiments, the OH concentration of silica glass sheet 28 formed using laser sintering system 10 is less than the OH concentration of silica material formed using some other formation methods (e.g., plasma sintering, flame sintering and/or sintering process that dry using chlorine prior to sintering). In contrast to some silica materials that utilize a surface treatment with a material such as hydrofluoric acid, silica glass sheet 28 has a low surface halogen concentration and a low surface OH concentration.

In various embodiments, sintered silica glass sheet 28 has a fictive temperature (Tf) that is higher than the Tf of at least some silica materials, such as silica boules. For example, it is believed that at least in some embodiments, sintered silica glass sheet 28 has a fictive temperature between 1100 degrees C. and 2000 degrees C., specifically between 1500 degrees and 1800 degrees C., and more specifically between 1600 degrees C. and 1700 degrees C. In a specific embodiment, sintered silica glass sheet 28 has a fictive temperature of about 1635 degrees C. (e.g., 1635 degrees C. plus or minus 1%), such as relative to fully-annealed such glass.

Figure 5:
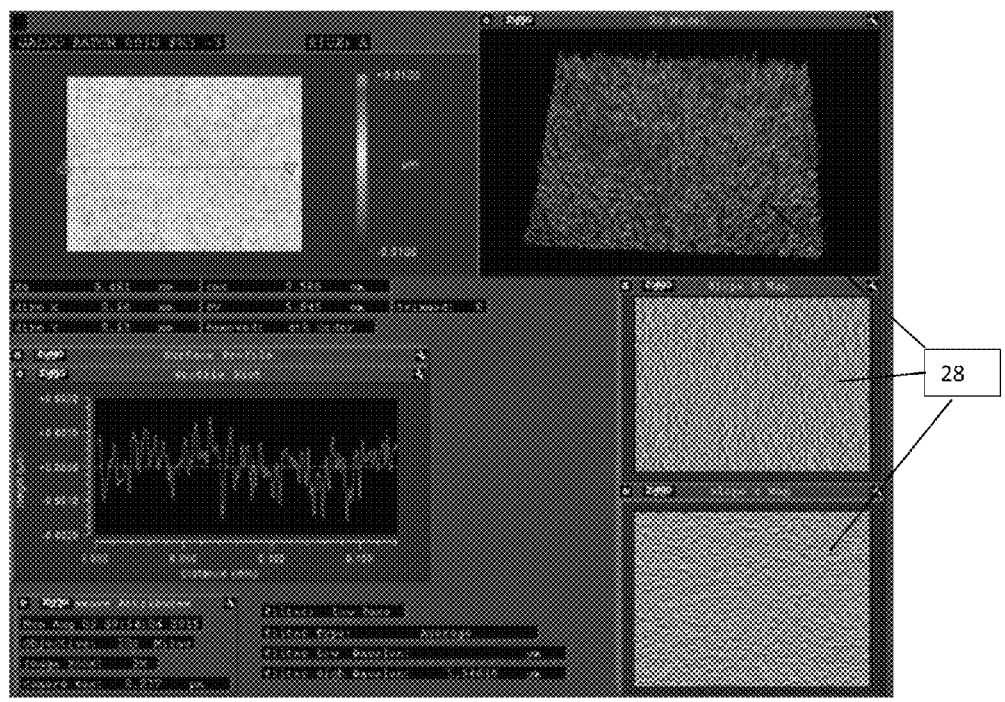
FIG. 5 shows the output from a Zygo optical profiler measuring the surface of a laser sintered silica glass sheet formed via laser sintering according to an exemplary embodiment.
Figure 6:
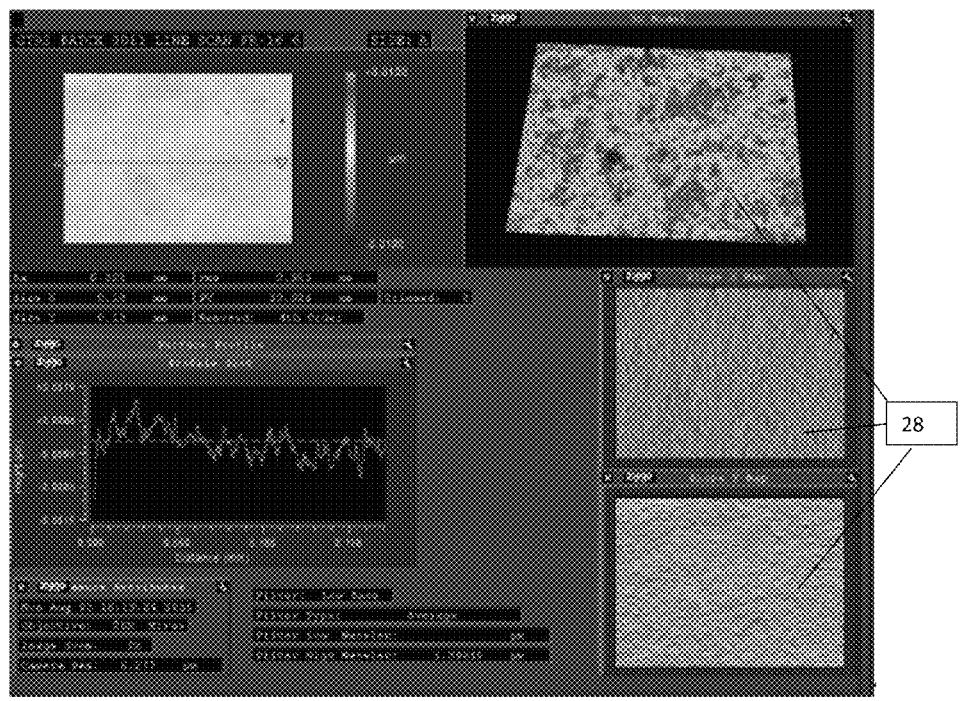
FIG. 6 shows the output from a Zygo optical profiler measuring the surface of a laser sintered silica glass sheet formed via laser sintering according to another exemplary embodiment.

Referring to FIGS. 5-8C, characteristics of the surface profile, topology and roughness of sintered glass sheet 28 are shown according to exemplary embodiments. FIG. 5 shows a Zygo optical profile scan of an embodiment of silica glass sheet 28 formed using a galvo based scanning laser system, such as that shown in FIG. 1. FIG. 6 shows a Zygo optical profile scan of an embodiment of silica glass sheet 28 formed using a geometrical/diffractive laser beam shaping, such as that shown in FIG. 2. FIG. 7 is a 3D micro-scale representation of a measured profile of a surface of an embodiment of silica glass sheet 28 according to an exemplary embodiment. FIGS. 8A-8C show an atomic force microscopy AFM line scans of the surface of the silica glass 28 taken widthwise at three different positions along the length of glass sheet 28 shown in FIG. 7.

In various embodiments, sintered glass sheet 28 has opposing first and second major surfaces, at least one of which has a high level of smoothness. In various embodiments, the roughness (Ra) of at least one of the first major surface and the second major surface of sintered glass sheet 28 is between 0.025 nm and 1 nm, specifically between 0.1 nm and 1 nm and specifically between 0.025 nm and 0.5 nm, over at least one 0.023 mm² area. In one such embodiment, Ra is determined using a Zygo optical profile measurement as shown in FIGS. 5 and 6, and specifically determined using the Zygo with a 130 µm×180 µm spot size. In some embodiments, the roughness (Ra) of at least one of the first major surface and the second major surface of sintered glass sheet 28 is between 0.12 nm and 0.25 nm as measured using AFM over a 2 µm line scan, as shown in FIGS. 8A-8C. In specific embodiments, sintered glass sheet 28 has a low roughness level on a small scale measurement, and a larger roughness level with a larger scale measure. In various embodiments, the roughness (Ra) of at least one of the first major surface and the second major surface of sintered glass sheet 28 is between 0.025 nm and 1 nm over at least one 0.023 mm² area, and an Ra of between 1 nm and 2 µm using a profilometer and a scan length of 5 mm.

As shown in FIGS. 5-8C, while the major surfaces of sintered glass sheet 28 are smooth, the surfaces do have a nanoscale surface topology including series of raised and recessed features. In the embodiments discussed herein, the raised and recessed features are relatively small contributing to the low surface roughness. In various embodiments, each raised feature has a maximum peak height that is between 0.1 µm and 10 µm, an specifically between 1 µm and 2 µm, relative to the average or baseline height of the topology as measured using a profilometer and a scan length of 5 mm. In specific embodiments, the topology of one or more surface of glass sheet 28 is such that the maximum vertical distance between the bottom of a recessed feature (e.g., a valley) and the top of a raised feature (e.g., a peak) is between 1 nm and 100 nm within at least one 0.023 mm² area as measured by a Zygo optical profile measurement. Table 1 shows roughness data from an AFM scan of a surface of a sintered glass sheet 28 according to an exemplary embodiment.

TABLE 1

| | | Roughness Measurements | | | |
|---|---|---|---|---|---|
| Scan No./Sample No. | scan size | Rq (nm) | Ra (nm) | Skewness | Kurtosis |
| Scan 1 - Sample 1 | 500 nm | 0.164 | 0.131 | −0.00552 | 3.03 |
| Scan 2 - Sample 1 | 500 nm | 0.173 | 0.138 | −0.0925 | 3.08 |
| Scan 3 - Sample 1 | 500 nm | 0.16 | 0.129 | 0.043 | 2.91 |
| Scan 4 - Sample 1 | 500 nm | 0.178 | 0.142 | 0.00239 | 3 |
| Scan 5 - Sample 1 | 500 nm | 0.164 | 0.131 | −0.00533 | 2.97 |
| Scan 6 - Sample 1 | 2 um | 0.219 | 0.174 | 0.0273 | 3 |
| Scan 7 - Sample 1 | 2 um | 0.196 | 0.156 | 0.0218 | 3 |
| Scan 8 - Sample 1 | 2 um | 0.204 | 0.162 | −0.0261 | 3.11 |
| Scan 9 - Sample 1 | 2 um | 0.202 | 0.161 | 0.0227 | 2.96 |
| Scan 1 - Sample 2 | 500 nm | 0.182 | 0.143 | 0.225 | 3.91 |
| Scan 2 - Sample 2 | 500 nm | 0.175 | 0.138 | 0.142 | 3.35 |
| Scan 3 - Sample 2 | 500 nm | 0.181 | 0.142 | 0.424 | 6.09 |
| Scan 4 - Sample 2 | 2 um | 0.215 | 0.167 | 0.685 | 12.1 |
| Scan 5 - Sample 2 | 2 um | 0.223 | 0.172 | 1.07 | 20.4 |
| Scan 6 - Sample 2 | 2 um | 0.231 | 0.179 | 0.705 | 11.1 |

As shown best in FIG. 7, silica glass sheet 28 may include a plurality of voids or bubbles. In various embodiments, some of the voids or bubbles may be located on the surface of silica glass sheet 28, forming depressions 50 shown in FIG. 7, and other bubbles or voids may be located within an internal area of the sintered silica material of silica glass sheet 28. In such embodiments, the bubbles or voids result in sheet 28 having a bulk density less than the maximum density of sintered silica without voids or bubbles. In various embodiments, sintered silica glass sheet 28 is a fully sintered silica sheet (e.g., one with a low amount or no unsintered silica soot particles) that has a density greater than 1.8 g/cc and less than 2.2 g/cc and specifically less than 2.203 g/cc (e.g., the maximum density of fully sintered silica without any voids or bubbles). In such embodiments, soot sheet 20 may have a starting density of between 0.2 g/cc to 0.8 g/cc, and through interaction with laser beam 26, soot sheet 20 densifies into fully sintered glass silica sheet that has a density greater than 1.8 g/cc and less than 2.203 g/cc, and more specifically between 1.8 g/cc and less than 2.15 g/cc. In various embodiments, formation of bubbles, voids or surface depressions 50 may be controlled via control of laser operation and may also be formed from impact with particulate matter traveling from soot burner 16. In various embodiments, voids within silica glass sheet 28 and specifically depressions 50 may be advantageous in applications such as a substrate for carbon nanotube (CNT) growth where depressions 50 act to hold CNT catalyst.

Figure 9:
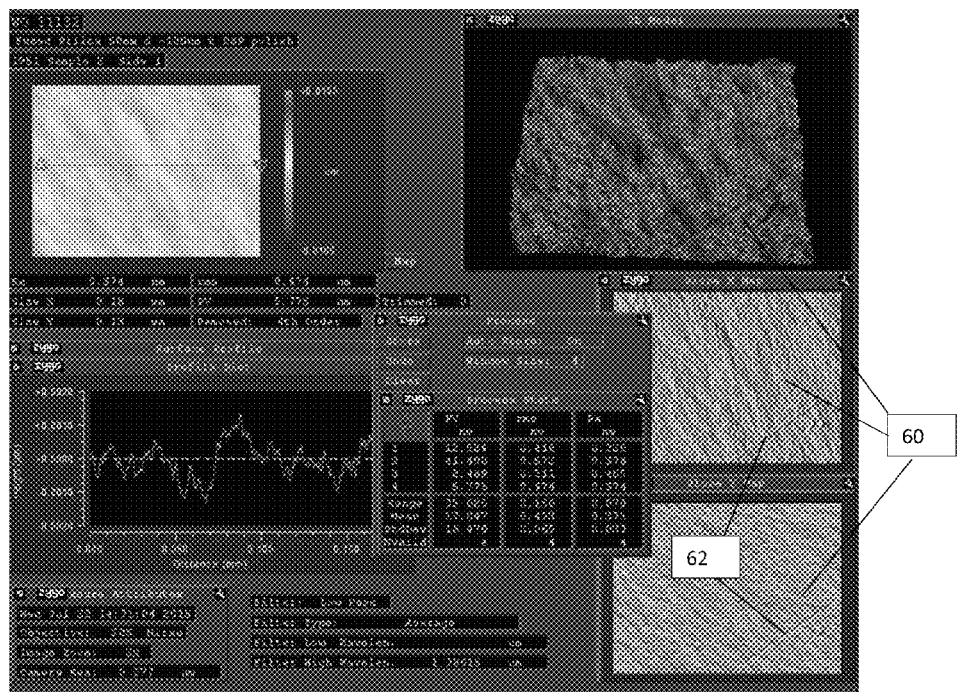
FIG. 9 shows a comparative output from a Zygo optical profiler measuring the surface of a non-laser sintered silica material following surface polishing.

For comparison, FIG. 9 shows a Zygo plot of a polished silica boule 60 formed from a non-laser sintering process, specifically a sliced and polished section from a silica ingot. As shown in FIG. 9, the polished silica boule 60 has a surface topology with a different appearance than the surface topologies of the different embodiments of sintered glass sheet 28 shown in FIGS. 5 and 6. For example, boule 60 has linear abrasion marks 62 that may be formed during different steps of the boule formation process, during handling and/or during polishing. In addition, the surface topology of boule 60 shown in FIG. 9 has directionality in which surface features extend generally in the direction of movement of the polishing device (extending from the upper left corner toward the bottom right corner in the image shown). In contrast, the surface topology of the embodiments of silica glass sheet 28 shown in FIGS. 5 and 6 exhibit a more random distribution of peaks and valleys with little or no directionality. In such embodiments, silica glass sheet 28 does not include elongate raised or recessed features, wherein the maximum length and maximum width of raised and/or recessed features is less than 10 µm, specifically less than 3 µm and in some embodiments, less than 1 µm, within at least one 0.023 mm² area.

In some embodiments, silica glass sheet 28 may have bulk curvature or warp such that the opposing major surfaces of silica glass sheet 28 deviate somewhat from a planar configuration. As shown in FIGS. 8A-8C in some embodiments, one of the major surfaces of silica glass sheet 28 has concave shape extending across the width of sheet 28 such that the center of one of the major surfaces of sheet 28 is positioned lower than the lateral edges of sheet 28. In various embodiments, the warp of sheet 28 is between 0.5 mm and 8 mm as measured within an area of 3750 mm². In a example, the warp of a sample of sheet 28 was measured and taken from the Werth gauge on sheet 28 having dimensions 50 mm×75 mm. In another embodiment, the warp of sheet 28 is less than 20 µm across a 150 mm×150 mm square area.

In various embodiments, silica glass sheet 28 has two major surfaces, the upper surface formed from the portion of soot sheet 20 facing soot burner 16, and the lower surface formed from the portion of soot sheet 20 which is in contact with drum 12. In various embodiments, either the upper surface or the lower surface or both of silica glass sheet 28 may have any of the characteristics discussed herein. In specific embodiments, upper surface of silica glass sheet 28 may have the surface characteristics discussed herein, and the lower surface has surface configuration, topology, roughness, surface chemistry, etc. that is different from the upper surface resulting from the contact with drum 12. In a specific embodiment, the lower surface of silica sheet has a roughness (Ra) that is greater than that of the upper surface, and the Ra of the lower surface of silica glass sheet 28 may be between 0 and 1 µm. In another embodiment, lower surface of silica sheet 28 has a roughness (Ra) that is less than that of the upper surface, and in such embodiments, cleaning of the soot deposition surface (e.g., surface 14 of drum 12) following removal of the soot sheet may result in the high level of smoothness of the lower surface of silica sheet 28.

In various embodiments, laser 24 may be controlled in various ways to form a fully sintered or partially sintered glass sheet 28 having different characteristics, layers and/or surface structures. Starting with a porous body such as soot sheet 20, it is possible to obtain a different porosity and/or surface topology in a partially or fully sintered sheet by varying the sintering conditions. In one embodiment, a $CO_2$ laser heat source creates a narrow sintering region that can be leveraged to control the porosity and surface topology. In various embodiments, sintering speed, laser type and laser power combinations can be varied based on various characteristics of soot sheet 20 (e.g., material type, thickness, density, etc.), based on requirements of the product utilizing the sintered sheet 28, and/or based on the requirements of downstream processes. In various embodiments, system 10 discussed above can be operated to form sintered sheet 28 with various characteristics. In various embodiments, system 10 can be operated at a sintering speed (e.g., speed of relative movement between the soot sheet and the laser) between 0.5 mm/s and 5 mm/s, and laser 24 may be a $CO_2$ laser having a power between 100 W and 300 W. In some embodiments, soot sheet 20 passes through the laser sintering region of laser 24 a single time, and in other embodiments, soot sheet 20 passes through the laser sintering region of laser 24 multiple times.

FIG. 10 provides examples of different structures that can be formed under different sintering conditions. As shown in the top pane of FIG. 10, a partially sintered glass sheet having a speckled surface structure can be formed by sintering a 500 micron soot sheet 20, having a bulk density of 0.35 g/cc, using 100 W $CO_2$ laser 24 generating an elongate laser beam (such as beam 42 in FIG. 2) with sintering speed (e.g., speed of relative movement between the soot sheet and the laser) of 0.65 mm/s. As shown in the middle pane of FIG. 10, a partially sintered glass sheet having more organized and linear surface structure can be formed by sintering a 500 micron soot sheet 20, having a bulk density of 0.35 g/cc, using 200 W $CO_2$ scanning laser 24 (e.g., as discussed above regarding FIG. 1) with a sintering speed (e.g., speed of relative movement between the soot sheet and the laser) of 1.3 mm/s. As shown in the bottom pane of FIG. 10, a fully sintered glass sheet having a smooth surface (as discussed herein) can be formed by sintering a 500 micron thick embodiment of soot sheet 20, having a bulk density of 0.35 g/cc, using 300 W $CO_2$ scanning laser 24 with sintering speed (e.g., speed of relative movement between the soot sheet and the laser) of 1.95 mm/s.

Further, in various embodiments, laser 24 may be controlled in various ways to form a fully sintered or partially sintered glass sheet 28 in which only a portion of soot sheet 20 is sintered such that a layer of sintered silica is supported by a lower layer of unsintered soot. In various embodiments, the remaining layer of soot may be removed prior to use of the sintered layer of silica, and in other embodiments, the remaining layer of soot may remain with the sintered layer of silica. In various embodiments, laser 24 may be controlled in various ways to form fully sintered structures within portions of unsintered soot. In some embodiments, sintered columns and/or hollow sintered tubes may be formed in soot sheet 20.

Figure 11:
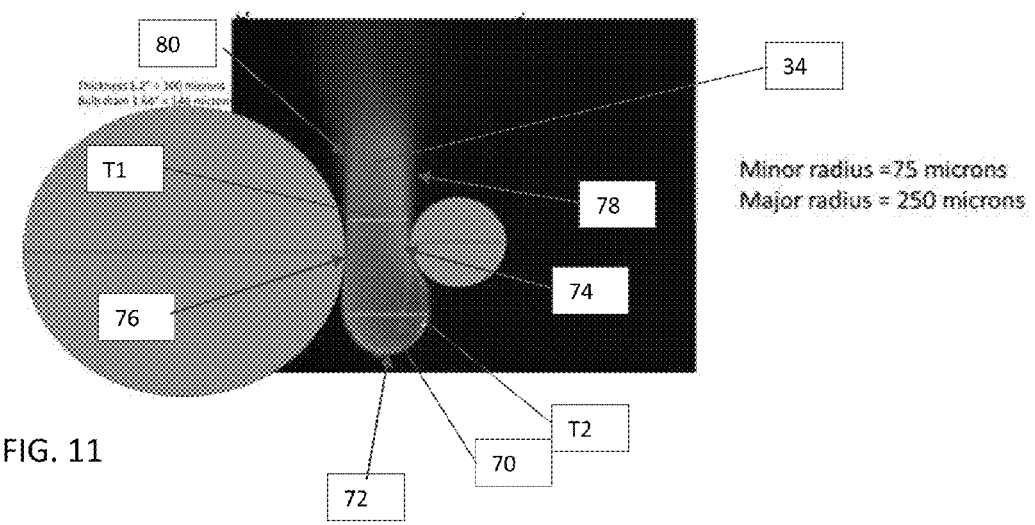
FIG. 11 is a cross-sectional view showing an edge section of a laser cut out subsection of a laser sintered silica glass sheet formed via laser sintering according to an exemplary embodiment.

Referring to FIG. 1 and FIG. 11, system 10 includes a cutting laser 30 that generates a cutting laser beam 32 that cuts a subsection 34 of sintered glass from glass sheet 28. In addition to cutting subsection 34 from glass sheet 28, cutting laser 30 is configured to form an edge structure surrounding and defining the outer perimeter of cut subsection 34. In various embodiments, the edge structure is a thickened or bulblike section of melted silica material that may act to strengthen the cut subsection 34.

In various embodiments, cutting laser 30 is a focused $CO_2$ laser beam. In one exemplary embodiment, a $CO_2$ laser beam with a focal length of about 860 mm is focused down to 500 µm in diameter. At a laser power of 200 W, the average power density at the focus is 1020 W/mm². At this power density, laser ablation occurs, and a 100 µm thick silica sheet was cut at a speed of 70 mm/s. The peak energy density during the laser ablation process is 11 J/mm². In contrast to prior laser cutting contemplated by Applicant, it was found that this high powered, energy dense laser created the strengthening edge profile discussed below.

Referring to FIG. 11, a cross-sectional view of sintered silica glass subsection 34 showing curved or bulb-shaped edge section 70. As shown in FIG. 11, edge section 70 is a thickened section located adjacent the curved outwardly facing surface 72 that defines the outer perimeter of sintered glass subsection 34. In various embodiments, T1 is the average thickness of cut subsection 34 and may be within any of the thickness ranges of sheet 28 discussed herein, and edge section 70 has a maximum thickness T2. In various embodiments, T2 is greater than 10% larger than T1, specifically is greater 20% larger than T1, and more specifically is about 40% larger than T1. In specific embodiments, T1 is about 100 µm and T2 is about 140 µm. In various embodiments, the increased thickness at T2 is located close to the outermost point of outwardly facing surface 72, such as within 300 µm, specifically within 200 µm and more specifically within 100 µm of the outermost point of outwardly facing surface 72.

In various embodiments, bulb-shaped edge section 70 extends around substantially the entire perimeter of glass subsection 34 such that T2 represents the average maximum thickness through bulb section 70 around the perimeter of glass subsection 34. In other embodiments, bulb-shaped edge section 70 extends around the entire perimeter of glass subsection 34 such that T2 represents the maximum thickness at all cross-sectional positions around the perimeter of glass subsection 34. In general, shape of bulb-shaped edge section 70 and T2 can be adjusted using suitable laser focus diameter and laser power level.

Cut glass subsection 34 includes a first curved transition section 74 providing the transition from the first major surface 78 to the edge section 70, and a second curved transition section 76 providing the transition from the second major surface 80 to the edge section 70. As shown, curved transition section 74 has a radius of curvature that is less than the radius of curvature of curved transition section 76. In various embodiments, curved transition section 74 has a radius of curvature that is between 25 µm and 200 µm, and the radius of curvature of curved transition section 76 is between 100 µm and 500 µm.

In such embodiments, edge section 70 is formed via the cutting process and does not need a secondary formation step to form edge section 70. Further it has been found that the melting process to form edge section 70 via cutting laser has less flaws and has a higher edge strength as compared to an edge structure formed via grinding. In various embodiments, the edge strength of edge section 70 is greater than 100 MPa, specifically is greater than 150 MPa, and more specifically about 200 MPa (e.g., 200 MPa plus or minus 1%). In various embodiments, edge section 70 acts to provide a high level of flexural strength, such as greater than 70 MPa, specifically greater than 100 MPa, and more specifically greater than 200 MPa. In various embodiments, the flexural strength of glass subsection 34 with edge section 70 is measured using a 2-point bend test. Such test methods determine the modulus of rupture (MOR) when bending glass and glass ceramics. Samples are subjected to mechanical flexure until failure occurs and peak load is recorded and converted to MOR. In such tests, MOR is the measure of flexural strength.

In various embodiments, the edge strength of edge section 70 can be further controlled, altered and/or enhanced by pre-heating the area that will form edge section such as through the use of a heater or a $CO_2$ laser beam prior to cutting. Preheating or annealing of the sheet prior to cutting reduces the amount of residual stress that may result from the cutting process. In an exemplary approach, a second laser beam may precede, coincide, or lag behind cutting laser beam 32. Preheating reduces the temperature difference of the cut region relative to the rest of the sheet, and thereby results in reduction in the residual stress that may result from the cutting process. Thus in this arrangement, annealing during the pre-heating step reduces the amount of residual stress from the cutting process, thus increasing edge strength.

In various embodiments, edge sections 70 of different sizes, thickness, shapes, etc. may be formed by increasing or decreasing laser power and/or movement speed. In some embodiments, tension in the length and/or width direction may be applied to sheet 28 during cutting by cutting laser 30 to influence the shape of edge section 70.

In some embodiments, sintered silica glass sheet 28 consists of at least 99.9% by weight, and specifically at least 99.99% by weight, of a material of the composition of $(SiO_2)_{1-x-y} \cdot M'_x M''_y$, where either or both of M' and M" is an element (e.g., a metal) dopant, or substitution, which may be in an oxide form, or combination thereof, or is omitted, and where the sum of x plus y is less than 1, such as less than 0.5, or where x and y are 0.4 or less, such as 0.1 or less, such as 0.05 or less, such as 0.025 or less, and in some such embodiments greater than $1 \times 10^{-6}$ for either or both of M' and M". In certain embodiments, sintered silica glass sheet 28 is crystalline, and in some embodiments, sintered silica glass sheet 28 is amorphous.

In various embodiments, sintered silica glass sheet 28 is a strong and flexible substrate which may allow a device made with sheet 28 to be flexible. In various embodiments, sintered silica glass sheet 28 is bendable such that the thin sheet bends to a radius of curvature of at least 500 mm without fracture when at room temperature of 25° C. In specific embodiments, sintered silica glass sheet 28 is bendable such that the thin sheet bends to a radius of curvature of at least 300 mm without fracture when at room temperature of 25° C., and more specifically to a radius of curvature of at least 150 mm without fracture when at room temperature of 25° C. Bending of sintered silica glass sheet 28 may also help with roll-to-roll applications, such as processing across rollers in automated manufacturing equipment.

In various embodiments, sintered silica glass sheet 28 is a transparent or translucent sheet of silica glass. In one embodiment, sintered silica glass sheet 28 has a transmittance (e.g., transmittance in the visual spectrum) greater than 90% and more specifically greater 95%. In various embodiments, the sintered silica glass sheets discussed herein have a softening point temperature greater than 700° C. In various embodiments, the sintered silica glass sheets discussed herein have a low coefficient of thermal expansion less than $10 \times 10\text{-}7/°$ C. in the temperature range of about 50 to 300° C.

While other sintering devices may be used to achieve some embodiments, Applicants have discovered advantages with laser sintering in the particular ways disclosed herein. For example, Applicants found that laser sintering may not radiate heat that damages surrounding equipment which may be concerns with sintering via induction heating and resistance heating. Applicants found that laser sintering has good control of temperature and repeatability of temperature and may not bow or otherwise warp sheet 28, which may be a concern with flame sintering. In comparison to such other processes, laser sintering may provide the required heat directly and only to the portion of the soot sheet needing to be sintered. Laser sintering may not send significant amounts of contaminates and gases to the sintering zone, which may upset manufacturing of the thin sheets. Further, laser sintering is also scalable in size or for speed increases.

In various embodiments, the silica soot sheets disclosed herein are formed by a system that utilizes one or more glass soot generating device (e.g., a flame hydrolysis burner) that is directed or aimed to deliver a stream of glass soot particles on to a soot deposition surface. As noted above, the silica sheets discussed herein may include one or more dopant. In the example of a flame hydrolysis burner, doping can take place in situ during the flame hydrolysis process by introducing dopant precursors into the flame. In a further example, such as in the case of a plasma-heated soot sprayer, soot particles sprayed from the sprayer can be pre-doped or, alternatively, the sprayed soot particles can be subjected to a dopant-containing plasma atmosphere such that the soot particles are doped in the plasma. In a still further example, dopants can be incorporated into a soot sheet prior to or during sintering of the soot sheet. Example dopants include elements from Groups IA, IB, IIA, IIB, IIIA, IIIB, IVA, IVB, VA, VB and the rare earth series of the Periodic Table of Elements. In various embodiments, the silica soot particles may be doped with a variety of materials, including germania, titania, alumina, phosphorous, rare earth elements, metals and fluorine.

Example 1

A 400 micron thick soot sheet, composed of essentially 100% silica, was prepared using the process as described in U.S. Pat. No. 7,677,058. A section of soot sheet 9 inches wide by 12 inches long was laid on a translating table in proximity to a $CO_2$ laser. The laser was a 400 W $CO_2$ laser, model number E-400, available from Coherent Inc. An asymmetric aspherical lens was positioned between the laser and the soot sheet. The asymmetric aspherical lens generates a line beam of 10 mm long and approximately 1 mm wide with uniform intensity distribution across both long and short axis. The lens was placed roughly 380 mm away from the soot sheet. A laser power of 18 watts of power was used. The soot sheet was moved at 1.25 mm/sec across the beam. Clear, sintered glass, fully densified, was created in the path of the beam. The sintered sheet had a surprisingly low amount of distortion as the soot was densified and shrunken away from the remaining soot sheet. In other sintering systems, the soot sheet would bend and deform unless held flat in a plane during the sinter process.

Example 2

Example 2 is the same as Example 1, except that the soot sheet was translated at 1.5 mm/sec. This produced a partially densified layer of glass atop of unsintered soot sheet.

Example 3

Example 3 is the same as Example 1, except that the essentially 100% silica soot sheet was solution doped to provide a small doping of Yb in the silica matrix, when sintered with the laser.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A high purity sintered silica glass sheet comprising:
a first major surface;
a second major surface opposite the first major surface;
an edge section surrounding the first and second major surfaces and defining an outer perimeter of the silica glass sheet;
at least 99.9 mole % silica, wherein a sodium (Na) content of the silica glass sheet is less than 50 ppm; and
an average thickness between the first major surface and the second major surface of less than 500 µm;
wherein the edge section has a maximum thickness around the other perimeter that is greater than the average thickness, wherein the maximum thickness of the edge section is located less than 300 µm from the outer perimeter;
wherein a roughness (Ra) of the first major surface is between 0.025 nm and 1 nm over at least one 0.023 $mm^2$ area of the first major surface.

2. The high purity sintered silica glass sheet of claim 1, wherein the roughness (Ra) of the first major surface of the sintered glass sheet is between 0.025 nm and 0.5 nm over at least one 0.023 $mm^2$ area of the first major surface, and the first major surface has a second Ra of between 1 µm and 2 µm as determined using a profilometer and a scan length of 5 mm.

3. The high purity sintered silica glass sheet of claim 1, wherein high purity sintered silica glass sheet is a fully sintered glass sheet further comprising a plurality of voids located on at least one of the first major surface, the second major surface and an internal area between the first and second major surfaces such that the density of the fully sintered silica glass sheet is greater than 1.8 g/cc and less than 2.2 g/cc.

4. The high purity sintered silica glass sheet of, claim 3, wherein at least some of the plurality of voids are on the first major surface forming depressions located on the first major surface.

5. The high purity sintered silica glass sheet of claim 1, wherein the first major surface includes a plurality of raised and recessed features each having a length and a width, wherein within at least one 0.023 $mm^2$ area of the first major surface, the maximum length and the maximum width of the raised features are less than 10 µm.

6. The high purity sintered silica glass sheet of claim 5, wherein a distance between a maximum peak height of the raised features and the maximum depth of the recessed features is between 1 nm and 100 nm within at least one 0.023 $mm^2$ area of the first major surface.

7. The high purity sintered silica glass sheet of claim 1, wherein the second major surface has a roughness, and the roughness of the second major surface is greater than the roughness of the first major surface.

8. A high purity sintered silica glass sheet comprising:
a first major surface;
a second major surface opposite the first major surface;
a thickened edge section comprising a curved outwardly facing surface extending between and surrounding the first and second major surfaces and defining an outer perimeter of the silica glass sheet, wherein the edge section has an edge section thickness;
at least 99.9 mole % silica, wherein a sodium (Na) content of silica glass sheet is less than 50 ppm; and average thickness between the first major surface and the second major surface of less than 500 pm;

wherein the edge section thickness is greater than the average thickness, wherein the thickened edge section extends around the outer perimeter of the glass sheet such that the edge section thickness around the outer perimeter is greater than the average thickness;

wherein at least one of (A) the edge section thickness is located less than 300 μm from the outer perimeter and (B) the edge section thickness is at least 10% greater than the average thickness.

9. The high purity sintered silica glass sheet of claim 8, wherein a roughness (Ra) of the first major surface of the sintered glass sheet is between 0.025 nm and 0.5 nm over at least one 0.023 mm$^2$ area of the first major surface, wherein the sheet is fully sintered and further comprises a plurality of voids located on at least one of the first major surface, the second major surface and an internal area between the first and second major surfaces such that the density of the fully sintered silica glass sheet is greater than 1.8 g/cc and less than 2.203 g/cc, wherein at least some of the voids are on the first major surface forming depressions located on the first major surface.

10. The high purity sintered silica glass sheet of claim 9, wherein the second major surface has a roughness, and the roughness of the second major surface is greater than the roughness of the first major surface.

11. The high purity sintered silica glass sheet of claim 8, wherein the first major surface includes a plurality of raised and recessed features each having a length and a width, wherein within at least one 0.023 mm$^2$ area of the first major surface, the maximum length and the maximum width of the raised features are less than 10 μm.

12. The high purity sintered silica glass sheet of claim 11, wherein a distance between a maximum peak height of the raised features and the maximum depth of the recessed features is between 1, nm and 100 nm within at least one 0.023 mm$^2$ area of the first major surface.

13. A high purity sintered silica glass sheet comprising:
a first major surface;
a second major surface opposite the first major surface;
an edge section surrounding the first and second major surfaces and defining an entire outer perimeter of the silica glass sheet;
at least 99.9 mole % silica, wherein a sodium (Na) content of silica glass sheet is less than 50 ppm; and
an average thickness between the first major surface and the second major surface of less than 500 μm;
wherein the edge section has an increased maximum thickness that is at least 10% greater than the average thickness, wherein the maximum thickness surrounds the first and second major surfaces.

14. The high purity sintered silica glass sheet of claim 13, wherein the edge section defines a rounded edge section that defines the entire outer perimeter and completely surrounding both the first and second major surfaces, wherein the maximum thickness is located less than 300 μm from the outer perimeter.

15. The high purity sintered silica glass sheet of claim 14, further comprising a first curved transition section providing the transition from the first major surface to the edge section, and a second curved transition section providing the transition from the second major surface to the edge section.

16. The high purity sintered silica glass sheet of claim 15, wherein the first curved transition section has a radius of curvature that less than a radius of curvature of the second curved transition section.

17. The high purity sintered silica glass sheet of claim 16, wherein the radius of curvature of the first curved transition section is between 25 μm and 200 μm, and the radius of curvature of the second curved transition section is between 100 μm and 500 μm.

18. The high purity sintered silica glass sheet of claim 13, wherein roughness (Ra) of the first major surface of the sintered glass sheet is between 0.025 nm and 0.5 nm over at least one 0.023 mm$^2$ area of the first major surface.

19. The high purity sintered silica glass sheet of claim 13, wherein the sheet is a fully sintered glass sheet further comprising a plurality of voids located on at least one of the first major surface, the second major surface and an internal area between the first and second major surfaces such that the density of the fully sintered silica glass sheet is greater than 1.8 g/cc and less than 2.2 g/cc.

20. The high purity sintered silica glass sheet of claim 19, wherein at least some of the voids are on the first major surface forming depressions located on the first major surface.

21. The high purity sintered silica glass sheet of claim 13, wherein the first major surface includes a plurality of raised and recessed features each having a length and a width, wherein within at least one 0.023 mm$^2$ area of the first major surface, the maximum length and the maximum width of the raised features are less than 10 μm.

22. The high purity sintered silica glass sheet of claim 21, wherein a distance between a maximum peak height of the raised features and the maximum depth of the recessed features is between 1 nm and 100 nm within at least one 0.023 mm$^2$ area of the first major surface.

23. The high purity sintered silica glass sheet of claim 13, wherein the second major surface has a roughness, and the roughness of the second major surface is greater than the roughness of the first major surface.

24. The high purity sintered silica glass sheet of claim 1, wherein, the maximum thickness of the edge section is at least 10% greater than the average thickness.

25. The high purity sintered silica glass sheet of claim 1, wherein the edge section comprises:
a curved outwardly facing surface that defines a rounded edge section that defines the entire outer perimeter and completely surrounds both the first and second major surfaces;
a first curved transition section providing a transition from the first major surface to the rounded edge section; and
a second curved transition section providing a transition from the second major surface to the rounded edge section;
wherein the maximum thickness of the edge section is located between the curved outwardly facing surface and the first and second curved transition sections in the radial direction.

26. The high purity sintered silica glass sheet of claim 1, wherein the maximum thickness of the edge section is greater than the average thickness at all positions around the perimeter of the glass sheet.

27. The high purity sintered silica glass sheet of claim 8, wherein the edge section thickness is at least 10% greater than the average thickness.

28. The high purity sintered silica glass sheet of claim 8, wherein the edge section thickness is at least 20% greater than the average thickness.

29. The high purity sintered silica glass sheet of claim 8, wherein the thickened edge section comprises:
a first curved transition surface providing a transition from the first major surface to the thickened edge section; and a second curved transition surface providing a transition from the second major surface to the thickened edge section, wherein a radius of curvature defining the second curved transition surface is greater than a radius of curvature defining the first curved transition surface;

wherein the edge section thickness teaches a maximum at a location between the curved outwardly facing surface and the first and second curved transition surfaces in the radial direction.

\* \* \* \* \*